US005083005A

United States Patent [19]
Degrigny

[11] Patent Number: 5,083,005
[45] Date of Patent: Jan. 21, 1992

[54] ELECTRODE FOR WORKING PLASMA TORCH AND CORRESPONDING TORCH

[75] Inventor: Patrick Degrigny, Lyons, France

[73] Assignee: L'Air Liquide, Societe Anonyme Pour l'Etude et l'Exploitation des Procedes Georges Claude, Paris, France

[21] Appl. No.: 552,092

[22] Filed: Jul. 13, 1990

[30] Foreign Application Priority Data

Jul. 28, 1989 [FR] France ................................ 89 10224

[51] Int. Cl.$^5$ ................................................ B23K 9/00

[52] U.S. Cl. .......................... 219/121.52; 219/121.48; 219/121.57; 219/121.5; 219/75

[58] Field of Search ...................... 219/121.48, 121.52, 219/119, 76.16, 75, 121.59, 121.50, 121.57

[56] References Cited

U.S. PATENT DOCUMENTS

| | | | |
|---|---|---|---|
| 3,930,139 | 12/1975 | Bykhovsky et al. | 219/121.52 |
| 4,567,346 | 1/1986 | Marhic | 219/121.52 |
| 4,766,349 | 8/1988 | Johansson et al. | 219/121.52 |
| 4,769,524 | 9/1988 | Hardwick | 219/121.52 |
| 4,810,851 | 3/1989 | Fridlyand | 219/121.52 |
| 4,864,097 | 9/1989 | Wallner | 219/121.52 |

FOREIGN PATENT DOCUMENTS 0144267 6/1985 European Pat. Off. .

OTHER PUBLICATIONS

"Effect of Methods of Producing Thermochemical Electrodes on Their Service Life in Welding Plasma Torches", *Welding International*, vol. 2, No. 10, 1988, By D. Dudko et al., pp. 870–873.

"Evaluating the Life of Non-Consumable Electrodes in the Arc Welding of Aluminium Alloys", *Welding International*, vol. 1, No. 9, 1987, by S. Poloskov et al., pp. 816–820.

*Primary Examiner*—Mark H. Paschall
*Attorney, Agent, or Firm*—Young & Thompson

[57] ABSTRACT

The support for the electrode has at its end a cavity at the bottom of which there is an emissive insert made of zirconium of hafnium. A portion of the support end around the insert has at least a portion of an electroconductive material axially projecting with respect to the insert. Application to plasma cutting torches ignition by short-circuit.

6 Claims, 1 Drawing Sheet

ELECTRODE FOR WORKING PLASMA TORCH AND CORRESPONDING TORCH

BACKGROUND OF INVENTION (a) Field of the Invention

The present invention relates to working plasma torch with ignition by short-circuit. It is firstly concerned with an electrode for such a torch, of the type comprising a support of electroconductive material having an end provided with an emissive insert, such as of zirconium or hafnium.

(b) Description of Prior Art

Cutting plasma torches operating with a plasma producing oxidizing gas are generally provided with a zirconium or hafnium emissive cathode, which is inserted in a copper member constituting an electroconductive support and a coolant, the assembly being generally called electrode.

During the operation of the torch the root of the arc is caught in the center of the cathode, where a crater is progressively formed on whose surface there is produced a layer of an oxide of zirconium or hafnium. When hot, this oxide is fluid and conductive and permits cathodic emission. When the plasma arc is interrupted, the oxide solidifies and becomes insulating. During solidification, there is frequently formed in the periphery of the crater, a swelling of oxide which projects on the front surface of the insert.

In the known arrangements, the insert is flush with the end face of the support. Then, the oxide swelling projects beyond this end face. If the swelling constitutes no impediment in the case of a conventional torch, where electrode and tuyere are fixed and where the formation of the arc is inititated by a high frequency discharge, in the case of short-circuit ignition torches such as those described in FR-A-2 556,549 and 2 562,748, where the ignition of the arc is obtained by producing a short-circuit between the electrode and the tuyere, it so happens that this oxide swelling forms an electrically insulating barrier which prevents the reliable passage of current between the electrode and the tuyere, and consequently, the reliable ignition of the arc.

SUMMARY OF THE INVENTION

The invention intends to improve the reliability of the ignition of the arc in short-circuit ignition torches, with a simple arrangement which does not burden the cost of production for these torches. For this purpose, it is an object of the present invention to provide an electrode for working plasma torch, of the type mentioned above, characterized in that an end portion of the support located around the insert comprises at least a portion of electroconductive material which axially projects with respect to the insert.

According to more specific embodiments:

the projecting portion, advantageously circular, is made of the same material as the support;

the insert is mounted in a recess provided at the bottom of a circular cavity formed in the end face of the support.

It is also an object of the invention to provide a working plasma torch, of the type comprising a torch body in which an electrode having an end face in which an emissive insert is mounted, and a tuyere having an internal face opposite the end face, which are movably mounted with respect to one another between a first working position, where said faces are spaced from one another and a second position where said faces are in mutual contact, characterized in that the second position, a space is provided between the insert and the portion facing the internal face of the tuyere.

BRIEF DESCRIPTION OF DRAWINGS

An embodiment of the invention will now be described with respect to the annexed drawings, in which.

Figure 1:
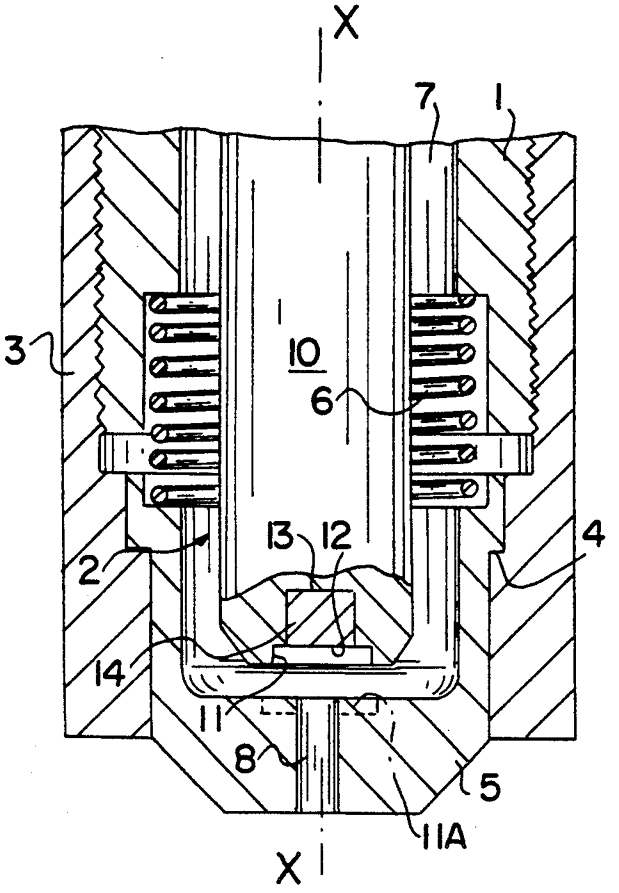
FIG. 1 is a partial schematic view in cross-section of a cutting plasma torch according to the invention.

The torch represented in FIG. 1 for the understanding of the invention is essentially that described in the document FR-A-2 556,549 mentioned above. It has a general symmetry along axis X—X presumably vertical and comprises a tubular body 1 in which is fixedly mounted an axial electrode 2. A tuyere carrier 3, screwed on body 1, defines an abutment shoulder 4 for a tuyere 5 in the form of a cupel axially slidably mounted and urged towards the abutment 4 by means of a spring 6 and, when in use, also by the pressure of the plasma forming gas arriving by the annular space 7 provided between the body 1 and the electrode 2.

Thus, the tuyere 5, which is formed with an axial central opening 8 for the exit of the arc and the plasma, is axially movable between a normal working position, such as represented, spaced from the lower end of the electrode, and a second ignition position of the arc by short-circuit, in which the internal transverse face of the tuyere comes in contact with the lower end face 9 of the electrode by resting on the metallic piece to be cut (not represented), an electric voltage being applied between the electrode and this piece.

The electrode 2 essentially comprises an electroconductive support 10 of copper whose end face 9 is planar and horizontal. A cylindrical cavity 11 is machined in the end face, and in the flat and horizontal bottom 12 of the latter there is provided a cylindrical blind recess 13 of a smaller diameter. A cathodic emissive insert 14, made of a cylindrical block of zirconium or hafnium, is forced into the recess 13. The insert is level with the bottom 12 of the cavity or slightly protrudes with respect to the latter. In this manner, in the second position, an axial space is provided between the end of the insert 1 and the portion opposite the internal face of the tuyere 5.

Figure 2:
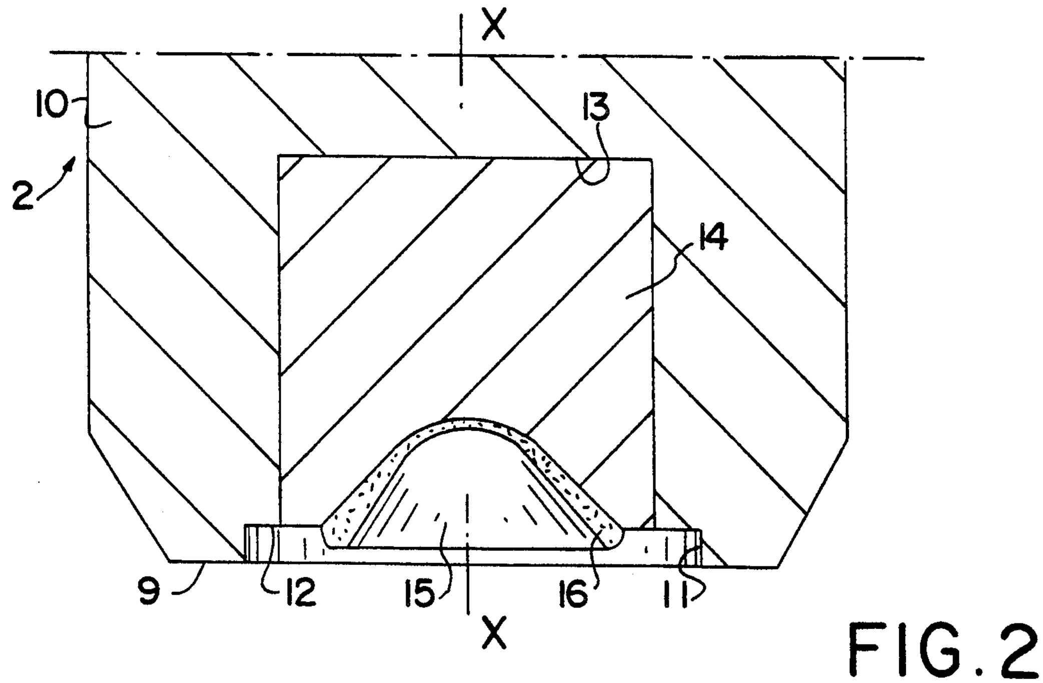
FIG. 2 is an axial cross-section view on a larger scale of the end face of the electrode.

After a certain period of use with an oxidizing plasma forming gas which is for example air or oxygen, the central part of the insert 14 forms a crater 15 whose periphery is covered with a circular swelling 16 of zirconium or hafnium oxide which is electrically insulating when cold (FIG. 2). The presence of the cavity 11, enables the swelling 16 not to project beyond the end face 9 of the support 10 so that ignition of the arc by short-circuit can continue in a reliable fashion.

As a variant, it will be understood that the same result can be obtained when the cavity is provided with an analogous diameter, in the internal face of the tuyere 5 opposite the electrode, as represented in broken line 11A in FIG. 1. The insert 13 can then be flush with the end face 9 of the cathode.

We claim:

1. In a plasma torch of the short circuiting ignition type comprising a nozzle having an internal face into which opens an arc and plasma opening, and an elongated electrode having a longitudinal axis and an end portion provided with an emissive insert, said nozzle and said electrode being relatively movable parallel to said axis between a working position wherein said end portion and said internal face are spaced from one another and an arc ignition position wherein said end portion contacts said internal face, said opening being in alignment with said axis; the improvement wherein in said arc ignition position said insert confronts but is permanently spaced, in a direction parallel to said axis, from an adjacent portion of said internal face of said nozzle surrounding said opening.

2. The structure of claim 1, wherein said internal face is flat and said insert is fitted in a recessed central part of said end portion of said electrode.

3. The structure of claim 1, wherein said internal face is formed with a recessed portion facing said insert.

4. The structure of claim 1, wherein said nozzle is cup-shaped and supported in a body enclosing said electrode and defining internally a flow path for an oxidizing plasma forming gas towards said opening.

5. The structure of claim 4, wherein said nozzle is movably supported in said body and is urged towards said working position.

6. The structure of claim 1, and spring means yieldably urging said end portion and said internal face away from each other.

* * * * *